United States Patent
Hu et al.

(10) Patent No.: US 8,104,687 B2
(45) Date of Patent: Jan. 31, 2012

(54) CARD READING DEVICE FOR A VEHICLE

(75) Inventors: Hailong Hu, Jinxian County (CN); Lixin Xiao, Nanjing (CN); Tang Yu, Suzhou (CN)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 12/741,122

(22) PCT Filed: Oct. 29, 2008

(86) PCT No.: PCT/EP2008/064685
§ 371 (c)(1),
(2), (4) Date: Jul. 13, 2010

(87) PCT Pub. No.: WO2009/056572
PCT Pub. Date: May 7, 2009

(65) Prior Publication Data
US 2010/0276494 A1    Nov. 4, 2010

(30) Foreign Application Priority Data
Nov. 2, 2007  (CN) ...................... 2007 2 0193961 U

(51) Int. Cl.
G06K 19/06 (2006.01)

(52) U.S. Cl. .................... 235/482; 235/483; 235/485

(58) Field of Classification Search .................. 235/482, 235/483, 485, 487, 492, 493, 441
See application file for complete search history.

(56) References Cited

U.S. PATENT DOCUMENTS

| | | | | |
|---|---|---|---|---|
| 4,165,871 A | * | 8/1979 | Yamaguchi | 271/127 |
| 5,036,184 A | * | 7/1991 | Sasaki | 235/479 |
| 6,006,987 A | * | 12/1999 | Hoolhorst | 235/375 |
| 6,254,005 B1 | * | 7/2001 | Smith et al. | 235/486 |

FOREIGN PATENT DOCUMENTS

JP    2000-260524    9/2000

* cited by examiner

Primary Examiner — Daniel St.Cyr
(74) Attorney, Agent, or Firm — Cozen O'Connor

(57) ABSTRACT

A card reading device for vehicles having a base plate, a sliding plate part, and a spring part. The base plate has a vaulted groove, an opening surface located at one end, and an annular groove provided on the base surface of said vaulted groove. The sliding plate part is provided above the vaulted groove of the base plate, A bulging structure, contacts an inserted card and drives the sliding plate part in a direction vertical to the opening phase and facing away from the opening surface. A sliding part is provided on the side of the sliding plate part pointing toward the vaulted roof of the base plate. The sliding part slides in the direction parallel to the opening surface and is guided by the annular groove and restricted in the positioning thereof. The spring element and the base plate and the sliding plate part have contact with one another, and force is applied to the directed vertically to the opening surface. Fixing of the card and also easy removal are made possible.

10 Claims, 14 Drawing Sheets

CARD READING DEVICE FOR A VEHICLE

PRIORITY CLAIM

This is a U.S. national stage of application No. PCT/EP2008/064685, filed on Oct. 29, 2008 which claims priority to the Chinese Application No.: 2007 201 93961.4, filed: Nov. 2, 2007; the contents of which are incorporated here by reference.

BACKGROUND OF THE INVENTION

1. Field of the Invention

The present application relates to the field of vehicles, in particular to a card reader for vehicles, 2. Prior Art Vehicle data recorders (VDR) are apparatuses that record the vehicle travel data. The VDR can be fitted to various vehicles such as motor vehicles, water craft, or aircraft and can record and store the speed of travel, the time of travel, the route, and other status information in conjunction with the vehicle journey. Furthermore, data can be input and output via a connection such as a smart card.

To simplify the description, the following explanation will be based on the example of a VDR used in a motor vehicle. The motor vehicle VDR can completely and exactly record the relevant states of the motor vehicle while it is being driven, can completely record the motor vehicle route, and can regenerate this by special software on a computer. The device has practical importance in terms of a precaution against driving when tired, illegal excess motor vehicle speed, checking of negative behavior of the driver, analysis and investigations in the event of accidents, improving the level of compliance with traffic rules and the level of traffic monitoring, and ensuring safe operation of motor vehicles, etc. Motor vehicle VDRs have already been subject to significant improvements with regard to functions, volumes and characteristics, are resistant to the influences of moisture, water, corrosion and high temperatures, and can process various types of information and display motor vehicle operating states. It is likewise possible to carry out self-diagnoses and to effectively monitor a range of parameters such as the motor vehicle speed, the engine speed of revolution, the water temperature, the oil pressure, the amount of fuel, the oil consumption, and the electrical voltage of the battery, etc. Effective prevention and analysis of accident events are possible. In addition, the detailed recording of each individual start time, route, time of travel, maximum speed of the motor vehicle and time for which each motor vehicle maximum speed was maintained are recorded, thus allowing the monitoring authorities to effectively monitor the motor vehicle in a simple manner, based on the recorded data.

The smart card is often inserted and removed during use of the motor vehicle VDR. The motor vehicle can be started after insertion of the smart card. However, the smart card may fall out while the motor vehicle is traveling, because of vibration or for other reasons. The VDR can no longer record any more data after the smart card has fallen out. For this reason, the smart card should not fall out.

At present, an automatic card reader for motor vehicle VDRs is already available. This automatic card reader can be operated relatively easily, but has a quite complicated design with numerous different components and, because of this, the production costs are relatively high. A manual card reader is now proposed, because of the enormous costs of automatic card readers. The smart card is firmly clamped in this manual card reader by a plastic spring structure. Because the card often has to be inserted and removed during the course of practical use, the spring pressure must not be made excessive since, otherwise, the card cannot be removed without difficulty. However, if the spring pressure is too weak, the card can fall out very easily. This results in a contradiction for the design of the manual card reader.

SUMMARY OF THE INVENTION

The present application provides a card reader for vehicles in which the contradiction mentioned above with respect to the prior art can be overcome, and the card can be clamped firmly, and can at the same time be removed easily.

The invention relates to a card reader for vehicles, said card reader having a base plate, a sliding plate part and a spring part. The base plate has a curved-in groove, and an opening area is located at one end of the relevant curved-in groove as an insertion opening for the card, and an annular groove is provided on the base area of the curved-in groove. The sliding plate part is provided above the curved-in groove. in the base plate. A side of the sliding plate part that points toward the curved-in groove in the base plate is at a distance from the base area of the curved-in groove in the base plate which is greater than or equal to the thickness of the card. A curved-out structure is provided on that side of the sliding plate part that points toward the curved-in groove in the base plate mentioned above, which structure can make contact with the inserted card and can drive the sliding plate part such that it slides in a direction vertically with respect to the opening area and facing away from the opening area. A sliding part is provided on that side of the sliding plate part that points toward the curved-in groove in the base plate. The sliding part mentioned above can slide in a direction parallel to the opening area is guided through the annular groove, and is restricted in its position. The spring element as well as the base plate and the sliding plate part make contact with one another, and force is applied to the sliding plate part, which force is directed vertically with respect to the opening area and toward the opening area.

The sliding plate part has: a large sliding plate part and a small sliding plate part, wherein a sliding groove is provided on that side of the large sliding plate part that points toward the curved-in groove in the base plate, which sliding groove runs vertically with respect to the opening area. The small sliding plate part has an outward bulge on its side facing away from the curved-in groove in the base plate, wherein the relevant outward bulge is inserted into the sliding groove, which runs vertically with respect to the opening area. A sliding groove is provided on that side of the small sliding plate part that points toward the curved-in groove in the base plate, which sliding groove runs parallel to the opening area mentioned above. One end of the sliding part is provided in the sliding groove, which runs parallel to the opening area.

An opening is provided on each of the two sides of the sliding plate part referred to above which run vertically with respect to the opening area. The curved-out structure referred to above is inserted into the openings, and abuts against the clamp, from that side of the large sliding plate part, which faces away from the curved-in groove in the base plate, which clamp is located away from that side of the large sliding plate part mentioned above which points toward the curved-in groove in the base plate.

The spring part is a spring or a spring plate.

The annular groove has a contact switch on its part remote from the opening area, which contact switch allows contact with the sliding part, in order to confirm correct insertion of the card. The circle center point of the curved part of the annular groove, which is located remote from the opening area is preferably located outside the annular groove, wherein the contact switch is provided at the upper end of the relevant curved part of the annular groove. The annular groove is designed for opposing-direction position restriction, wherein the design for opposing-direction position restriction has a plurality of inclined surfaces, each having a vertical surface.

A direction of all of the plural vertical surfaces is arranged in a standard form in the clockwise sense or in the counter-clockwise sense. The plurality of inclined surfaces, which each have a vertical surface is 4, 2 of which are located on one side of the contact switch, while the other 2 are located on the other side of the contact switch.

The vehicle may be a motor vehicle, an aircraft or a water craft.

In the case of the card reader for vehicles according to one embodiment of the present application, guidance and position restriction of the sliding part are carried out by the annular groove, and that the force which the spring part applies vertically to the sliding plate part, vertically with respect to the opening area and toward the opening area as the insertion opening in the card reader can hold the card firmly and also allows the card to be removed easily.

BRIEF DESCRIPTION OF DRAWINGS

The present application will be explained in detail in the following text with reference to the attached figures, in order in this way to allow normally trained specialist personnel to understand the special features and advantages of the present application.

DETAILED DESCRIPTION OF THE DRAWINGS

Figure 1:
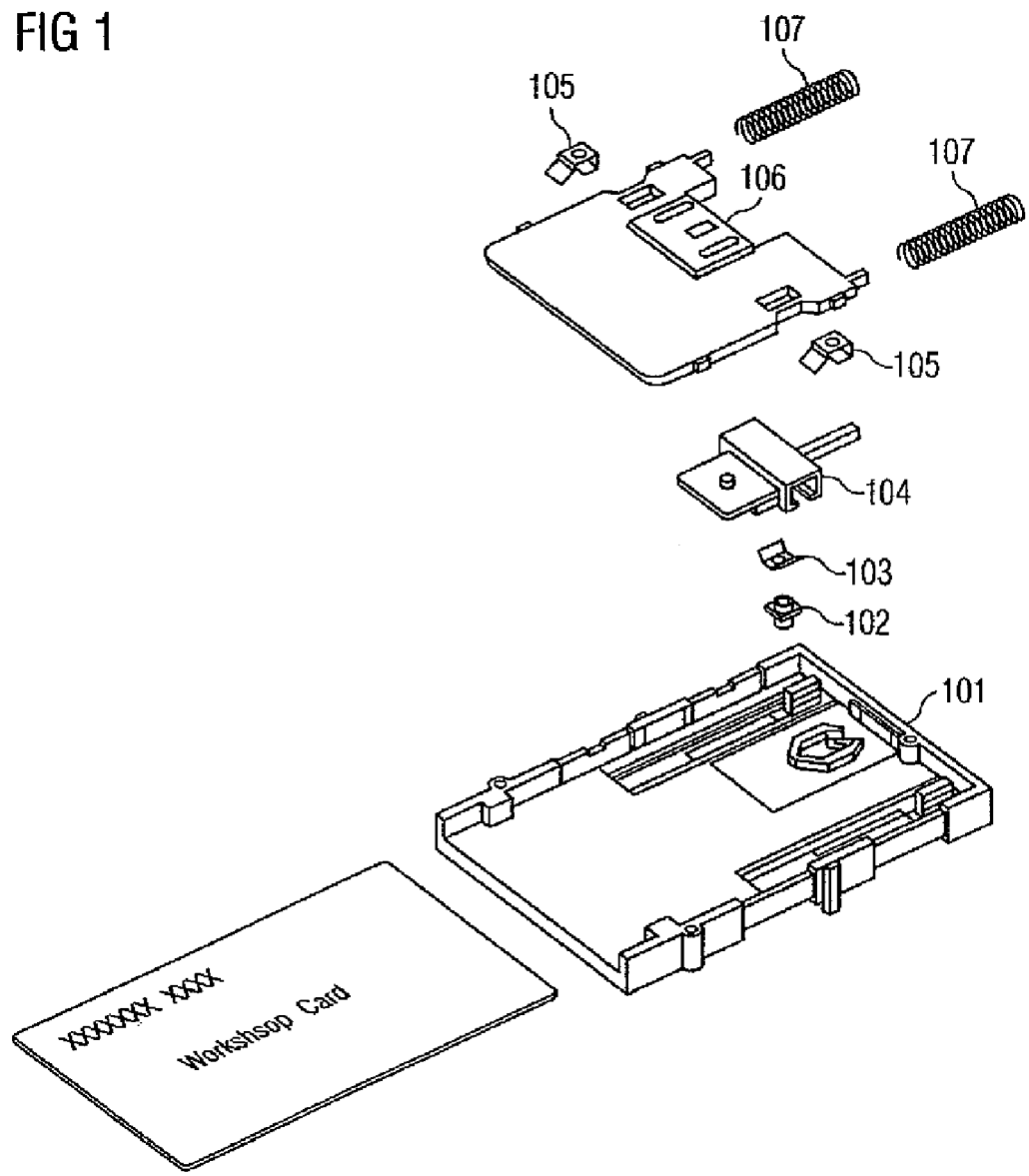
FIG. 1 is the individual component parts of a manual card reader of one embodiment of the present invention.

In order to achieve the objective of describing the technical planning draft and the advantages of the present application even better, a further detailed explanation of the present application will be provided in the following text, based on the attached figures.

In one embodiment of the invention, a card reader for a vehicle is provided, which has a base plate, a sliding plate part and a spring part. The base plate has a curved-in groove, and an opening area is located at one end of the relevant curved-in groove as an insertion opening for the card, and an annular groove is provided on the base area of the curved-in groove. The sliding plate part is provided above the curved-in groove in the base plate, and that side of the sliding plate part which points toward the curved-in groove in the base plate is at a distance from the base area of the curved-in groove in the base plate which is greater than or equal to the thickness of the card. a curved-out structure is provided on that side of the sliding plate part which points toward the curved-in groove in the base plate, which structure can make contact with the inserted card and can drive the sliding plate part such that it slides in a direction vertically with respect to the opening area and facing away from the opening area; a sliding part is provided on that side of the sliding plate part which points toward the curved-in groove in the base plate. The sliding part can slide in a direction parallel to the opening area, is guided through the annular groove, and is restricted in its position; the spring element as well as the base plate and the sliding plate part make contact with one another, and force is applied to the sliding plate part, which force is directed vertically with respect to the opening area and toward the opening area.

In particular, the sliding plate part may have: a large sliding plate part and a small sliding plate part. A sliding groove is provided on that side of the large sliding plate part which points toward the curved-in groove in the base plate, which sliding groove runs vertically with respect to the opening area; the small sliding plate part has an outward bulge on its side facing away from the curved-in groove in the base plate. The relevant outward bulge is inserted into the sliding groove, which runs vertically with respect to the opening area; a sliding groove is provided on that side of the small sliding plate part which points toward the curved-in groove in the base plate, which sliding groove runs parallel to the opening area; one end of the sliding part is provided in the sliding groove, which runs parallel to the opening area.

An opening is provided on each of the two sides of the sliding plate part which run vertically with respect to the opening area; the curved-out structure is inserted into the openings, and abuts against the clamp, preferably from that side of the large sliding plate part which faces away from the curved-in groove in the base plate, which clamp is located away from that side of the large sliding plate part which points toward the curved-in groove in the base plate.

The spring part may be a spring or a spring plate.

The annular groove may have a contact switch remote from the opening area, which contact switch allows contact with the sliding part to confirm correct insertion of the card. The circle center point of the curved part of the annular groove, which is located remote from the opening area is preferably located outside the annular groove. The contact switch is provided at the upper end of the relevant curved part of the annular groove. The annular groove is designed for opposing-direction position restriction, wherein the relevant design for opposing-direction position restriction can have a plurality of inclined surfaces, each having a vertical surface.

The direction of all of the plurality of vertical surfaces is arranged in a standard form in the clockwise sense or in the counterclockwise sense. The total number of inclined surfaces which each have a vertical surface is 4, 2 of which are located on one side of the contact switch, while the other 2 are located on the other side of the contact switch.

The present application will be explained in detail in the following text with reference to a card reader for a motor vehicle.

Figure 2:
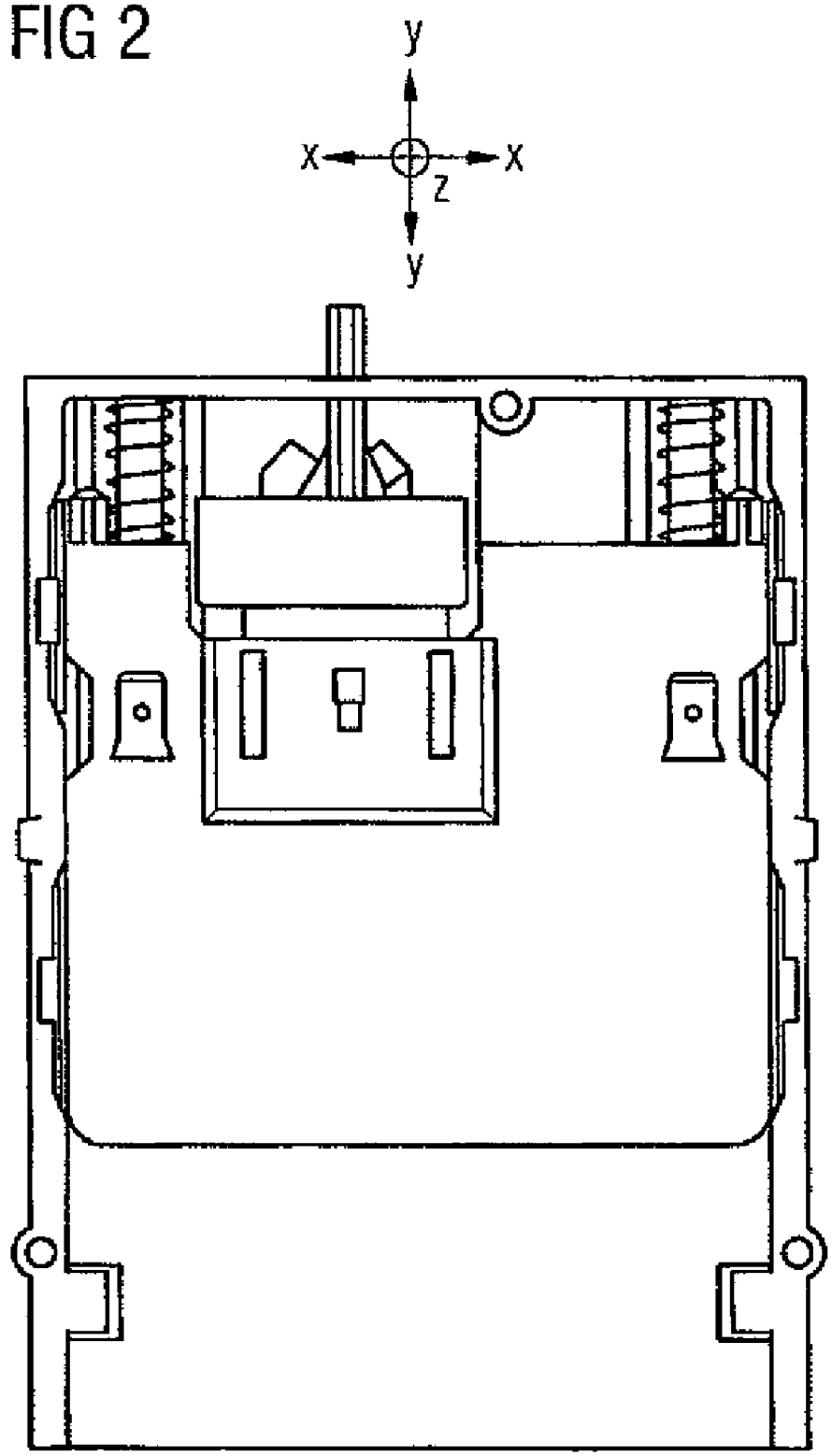
FIG. 2 is a plan view of a manual card reader of one embodiment of the present invention.

FIG. 1 illustrates the individual component parts of a card reader for a motor vehicle in one embodiment of the invention. FIG. 2 is a plan view of a card reader for a motor vehicle in one embodiment according to the present invention. A horizontal axis X, a vertical axis Y and a vertical direction Z are defined in FIG. 2.

As shown in FIG. 1, the relevant card reader for motor vehicles has a base plate 101, a sliding part 102, a spring plate 103, the small sliding plate 104, two clamps 105, the large sliding plate 106 and two springs 107 (the spring 107 at this point may also be a spring plate). The two clamps 105 are provided on the two sides to the left and right of the large sliding plate 106 with respect to the longitudinal movement, and form the large sliding plate part. A structure for protection against falling out is preferably provided on the large sliding plate 106. The two clamps 105 and the large sliding plate 106 are firmly connected to one another and are secured against falling out by the structure provided on the large sliding plate 106, as a result of which the two clamps 105 cannot fall out.

The spring plate 103 is fitted to the sliding part 102 and is provided jointly in the sliding groove in the small sliding plate 104, thus forming the small sliding plate part. The sliding part 102 can move such that it slides along the direction X in the small sliding plate 104. Without any external force in the direction Z, continuous positioning takes place in the lower area, and an upward movement can take place after a force is applied to the base plate (in which case, the external force is greater than the spring force of the spring plate 103). The large sliding plate part and the small sliding plate part are fitted together and form the sliding plate part. The small sliding plate 104 can be moved along the direction Y in the large sliding plate 106, in which case the freedom of movement does not go beyond the sliding groove in the large sliding plate 106.

The sliding plate part is then provided in the base plate 101, and two springs 107 are fitted, thus completing the assembly process. In this case, the sliding plate part can be moved along the direction Y in the base plate 101.

Figure 3:
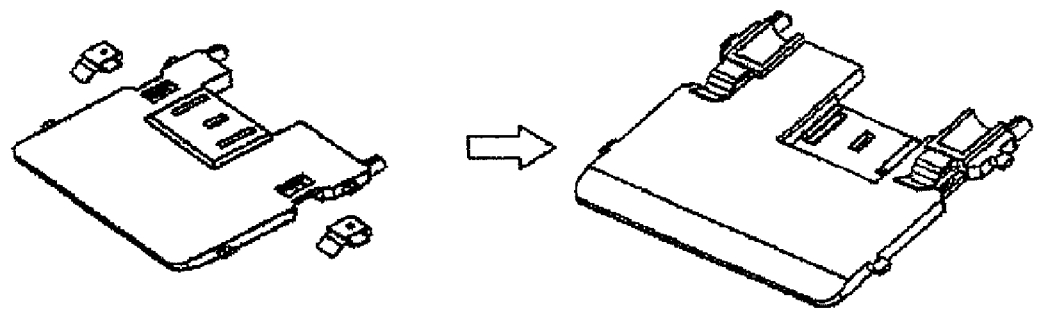
FIG. 3 illustrates fitting a large sliding plate part of one embodiment of the present invention.
Figure 4:
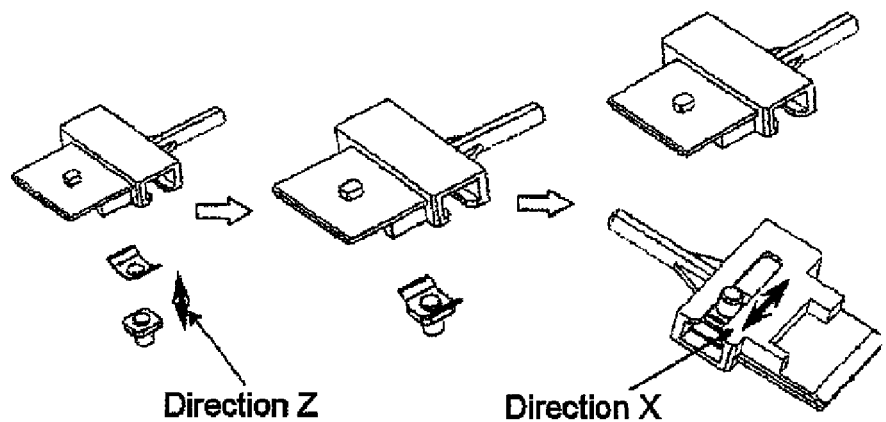
FIG. 4 illustrates fitting a small sliding plate part according to one embodiment of the present invention.
Figure 5:
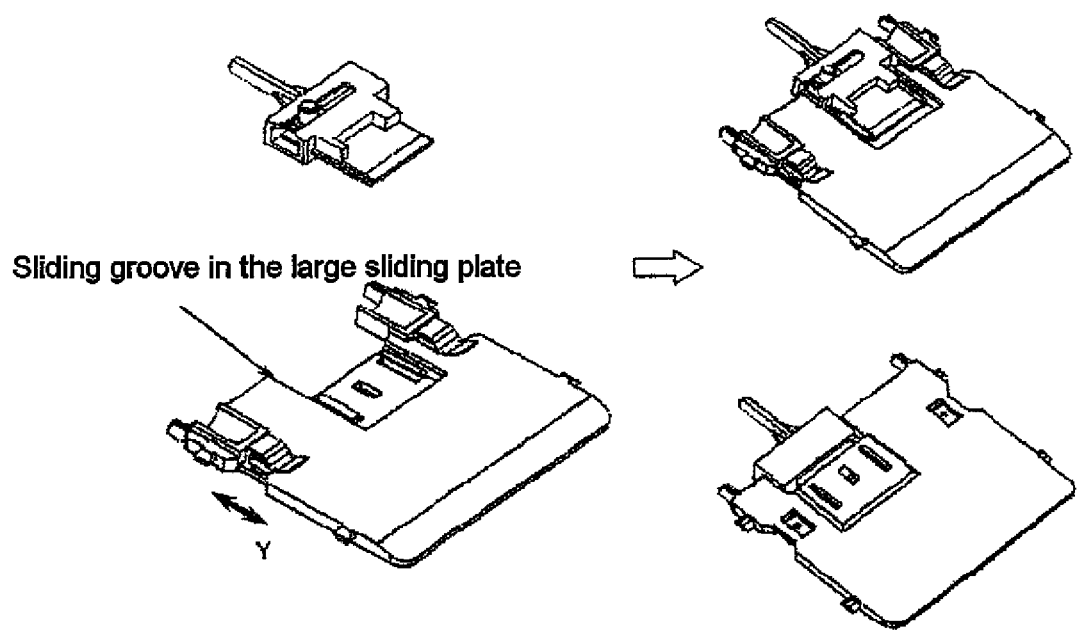
FIG. 5 illustrates fitting a sliding plate part of one embodiment of the present invention.
Figure 6:
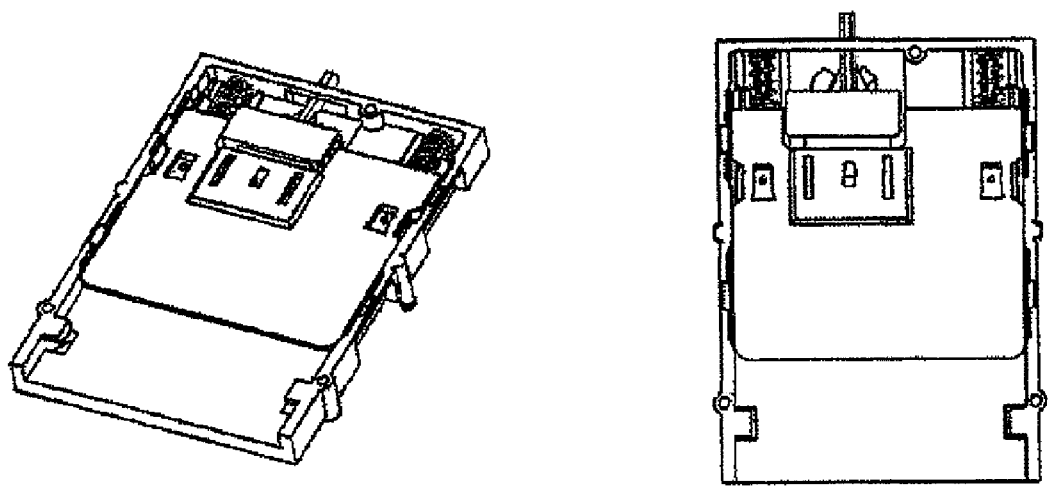
FIG. 6 is a sliding plate part, fitted into a base plate, of one embodiment of the present invention.
Figure 7A:
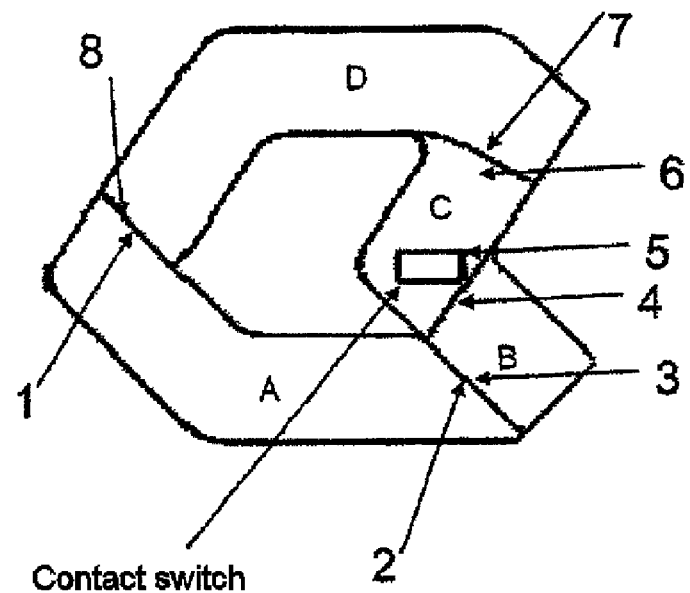
FIG. 7a is an annular groove in one embodiment of the invention.
Figure 7B:
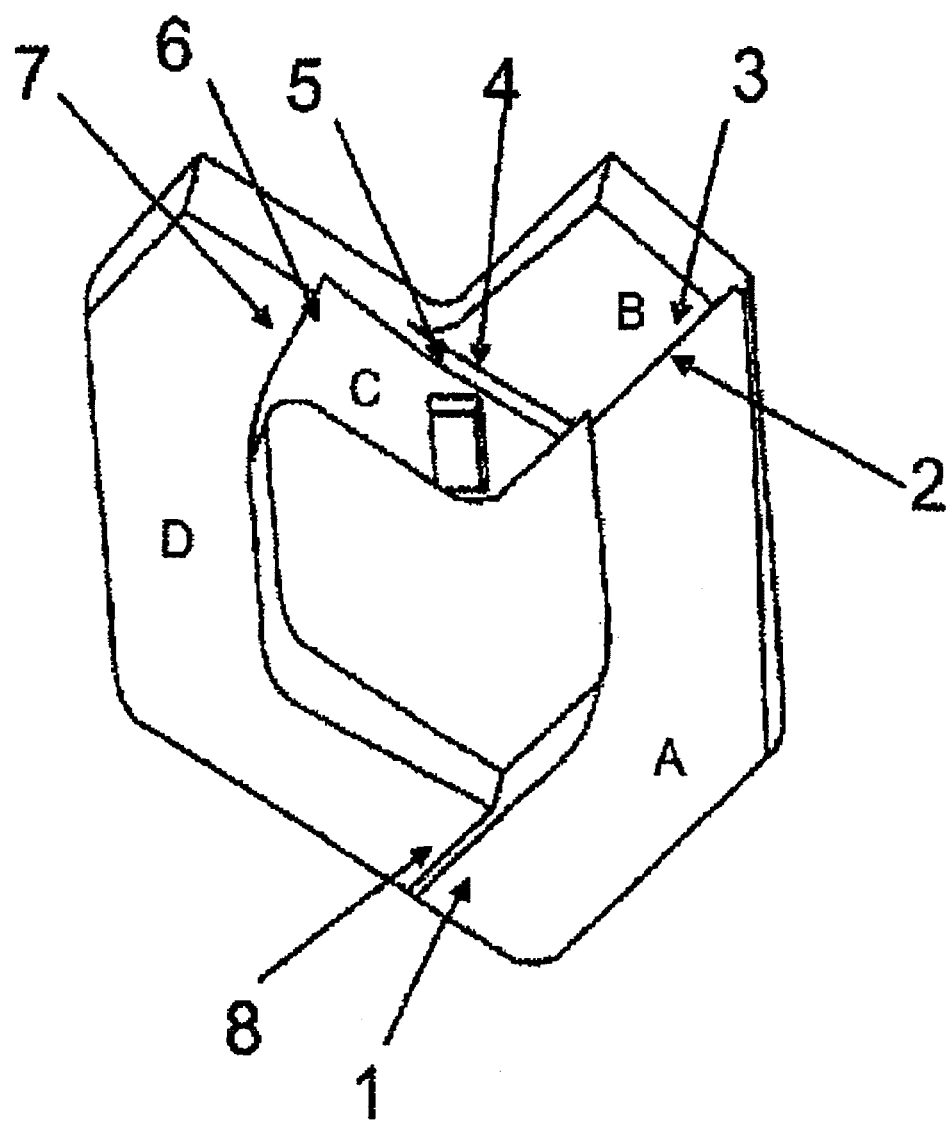
FIG. 7b is the annular groove in one embodiment of the present invention.

FIG. 3 illustrates fitting of the large sliding plate 106 in embodiment according to the present application. FIG. 4 illustrates the fitting of the small sliding plate 104 in one embodiment according to the present application. FIG. 5 illustrates the fitting of the sliding plate 106 in one embodiment according to the present application. FIG. 6 illustrates the sliding plate 106, fitted into the base plate 101, in one embodiment according to the present application. FIG. 7a illustrates the annular groove in base plate 101 in one embodiment according to the present application. FIG. 7b shows a further illustration of the annular groove in one embodiment according to the present application.

As shown in FIG. 7a and FIG. 7b, the sliding part 102 can be moved in the annular groove, corresponding to the shape of the inclined surfaces, after the assembly process stated above has been carried out, in such a way that the annular groove guides the sliding part. The inclined surfaces can be defined as surfaces A, B, C and D in the direction Z, corresponding to the sequence of insertion and removal of the card, because the base area of the annular groove is not a flat surface but is formed from 4 inclined surfaces from the bottom upwards.

As shown in FIG. 7a and FIG. 7b, the surface A relates to the position 1 to the position 2 with a gradual increase. After reaching the position 2, there is a sudden drop to the position 3. The surface B relates to the position 3 to the position 4 with a gradual increase. After reaching the position 4, there is a sudden drop to the position 5. The surface C relates to the position 5 to the position 6 with a gradual increase. After reaching the position 6, there is a sudden drop to the position 7. The surface D relates to the position 7 to the position 8 with a gradual increase. After reaching the position 8, there is a sudden drop to the position 1. After the sliding part 102 has reached the surface C, the process of insertion of the card ends. The sliding part 102 now abuts against a contact switch, which is provided on the surface C, in order to confirm that the insertion position of the card has been reached.

In the summary of the attached figures mentioned above, the following text provides a detailed explanation of a complete process of insertion and removal of the card into and from the card reader according to the present application. In order to simplify understanding, the insertion and the removal of the card may be described as different states. In fact, this is a continuous process.

Figure 8:
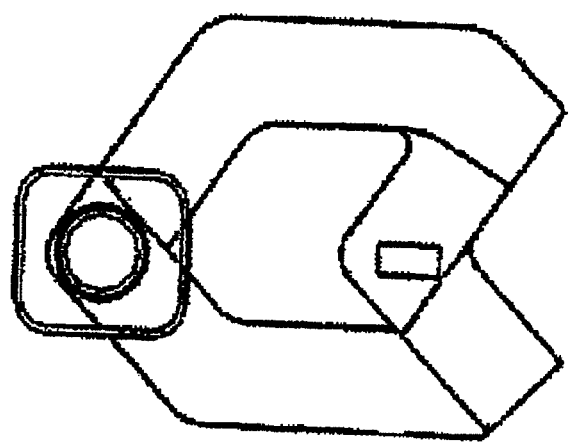
FIG. 8 is a position of the sliding part for the D0a/D0b/D1 state in the annular groove of one embodiment of the invention.
Figure 9:
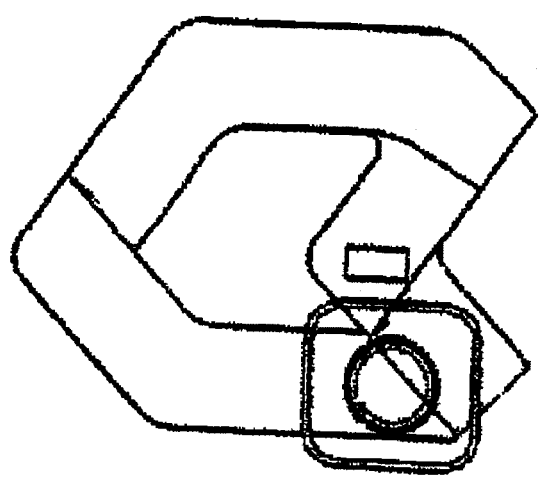
FIG. 9 is a position of the sliding part for the D2a state in the annular groove of one embodiment of to the invention.
Figure 10:
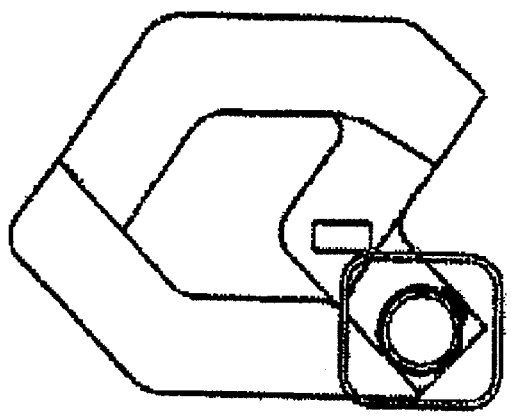
FIG. 10 is a position of the sliding part for the D2b state in the annular groove of one embodiment of the invention.
Figure 11:
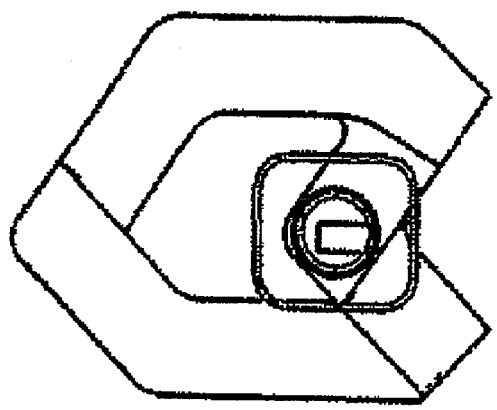
FIG. 11 is a position of the sliding part for the D3 state in the annular groove of one embodiment of the invention.
Figure 12:
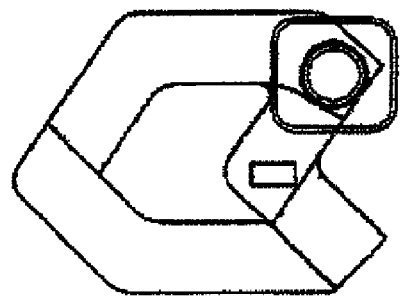
FIG. 12 is a position of the sliding part for the D4 state in the annular groove of one embodiment of the invention.
Figure 13:
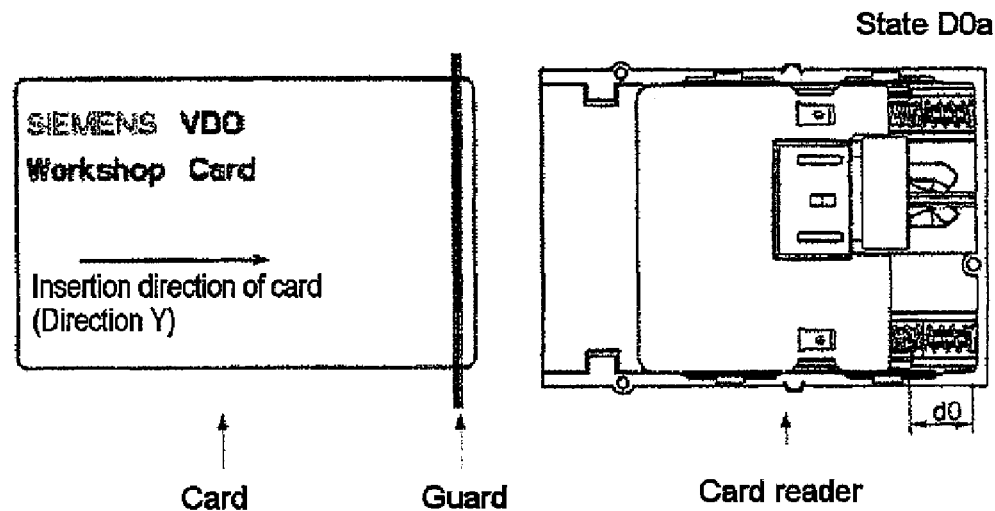
FIG. 13 is an original operating state of one embodiment of the invention.

FIG. 8 illustrates the position of the sliding part 102 for the state D0a/D0b/D1 in the annular groove in one practical exemplary embodiment according to the present application. FIG. 9 illustrates the position of the sliding part 102 in the state D2a in the annular groove in one practical exemplary embodiment according to the present application. FIG. 10 illustrates the position of the sliding part 102 in the state D2b in the annular groove in one practical exemplary embodiment according to the present application. FIG. 11 illustrates the position of the sliding part 102 in the state D3 in the annular groove in one practical exemplary embodiment according to the present application. FIG. 12 illustrates the position of the sliding part 102 in the state D4 in the annular groove in one practical exemplary embodiment according to the present application. FIG. 13 illustrates the original operating state of one practical exemplary embodiment according to the present application.

Initially, the sliding plate 106 remains in the state illustrated in FIG. 13, such that the present state can be defined as D0a. The card has not yet been inserted into the card reader. The distance between that end of the large sliding plate 106 which is remote from the opening area and that end of the base plate 101 which is remote from the opening area is set as d0. In the state D0a, the sliding part 102 is located at the position 1 of the surface A, that is to say at the position illustrated in FIG. 8.

Figure 14:
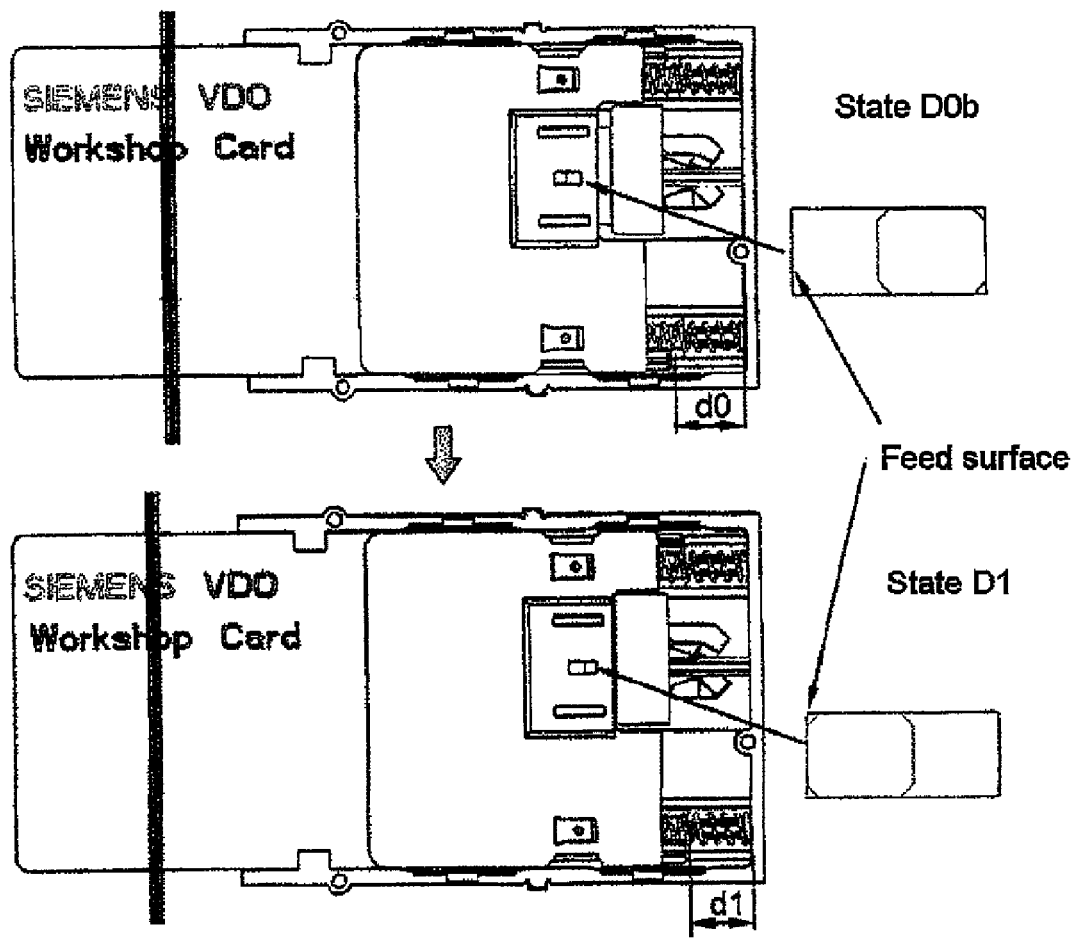
FIG. 14 is a state D0b and a state D1 during insertion of the card in one embodiment of to the invention.

The card is then inserted into the card reader and is in the inserted state D0b illustrated in FIG. 14. In the state D0b, the sliding part 102 is located at the position 1 of the surface A. At this time, the card has reached the opening of the clamps 105. Because the clamps 105 are now subject to a thrust in the direction opposite the spring force of the springs 107 and this thrust is greater than the spring force of the springs 107, as the card is inserted further, the large sliding plate 106 is moved forward until the state D1, illustrated in FIG. 14, is reached, with the card inserted.

In the state D1, the distance between that end of the large sliding plate 106 which is remote from the opening area and that end of the base plate which is remote from the opening area is d1. As before, the sliding part 102 is located at the position 1 of the surface A. However, the feed area of the large sliding plate 106 has already been moved from the original position without any overlap with the small sliding plate 104 to the position with an overlap with the small sliding plate part 104, as a result of which the small sliding plate part 104 has already been moved with respect to the large sliding plate part 106 in the direction of the opening area, sliding as far as the upper end of the sliding groove in the large sliding plate 106. In this way, the card is moved forward together with the large and small sliding plate parts 104, 106 as the insertion process continues.

Figure 15:
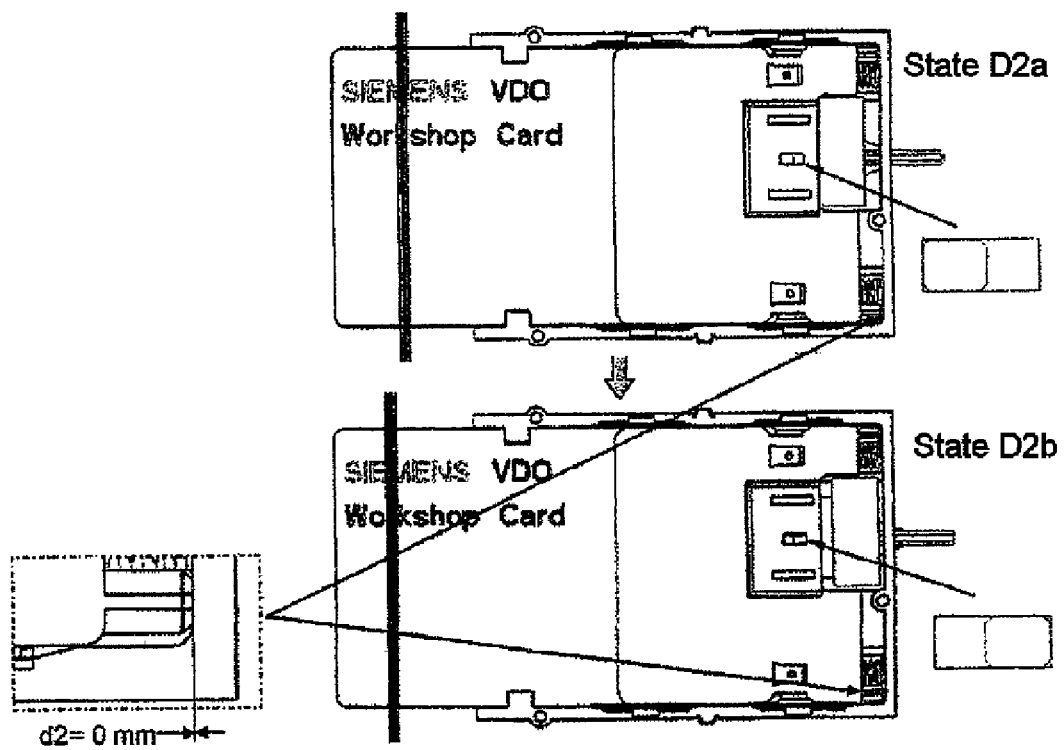
FIG. 15 is a state D2a and a state D2b during insertion of the card in one embodiment of the invention.

When the card and the sliding plate part 106 have been moved forward together as far as that end of the large sliding plate part which is remote from the opening area and abut against that end of the base plate 101 which is remote from the opening area, the sliding plate part 106 is clamped in, and the forward movement is stopped. The state D2a, as illustrated in FIG. 15, has now been reached, with the card inserted. In the state D2a, the distance between that end of the large sliding plate part 106 which is remote from the opening area and that end of the base plate 101 which is remote from the opening area is d2, equal to 0. The sliding part 102 is located at the position 2 of the surface A. The card can now be inserted into the two clamps 105 of the large sliding plate part 106, by the operator exerting a small amount of force. The state D2b illustrated in FIG. 15 has now been reached, with the card inserted. In the state D2b, the large and small sliding plate parts 104, 106 as well as the card cannot be moved any further forward. The sliding part 102 is located at the position 3 of the surface B.

Figure 16:
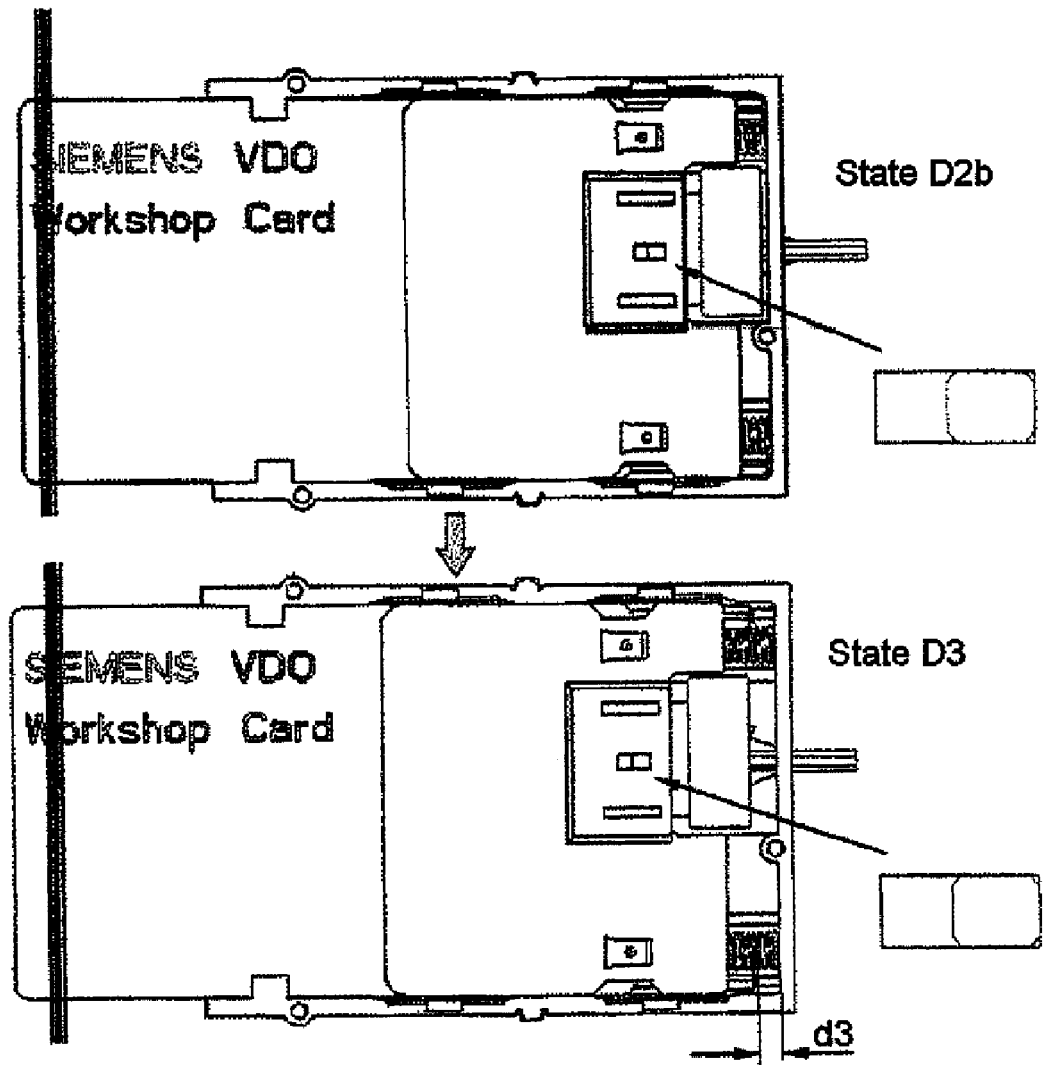
FIG. 16 is a state D2b and a state D3 during insertion of the card in one embodiment of the present invention.

After this, the operator cannot insert the card any further, and loosens his grip. When the grip is loosened, the sliding plate part 106 is subject to the force influence of the two springs 107 and is once again moved in the direction of the opening area until the position D3 illustrated in FIG. 16 is reached. The distance between that end of the large sliding plate part 106 which is remote from the opening area and that end of the base plate 101 which is remote from the opening area is now d3. The sliding part 102 reaches the position 5 of the surface C and makes contact with the contact switch provided on the surface C, thus confirming that the card has reached the inserted position. Furthermore, because of the configuration of the inclined surface shape of the annular groove, the sliding part now remains on the surface C, and can no longer move back to the surface B. For this reason, the sliding plate part is fixed by the common position restriction of the sliding part 102 and annular groove on the base plate 101, and the card is clamped in between the two clamps 105, as a result of which the card now remains firmly in the card reader.

The process of insertion of the card is now complete. A detailed description of the process of removing the card will be provided in the following text. In the state D3, the operator can remove the card only with great difficulty since only a small length and a small gripping area for the operator's finger is now available on the card on the outside of the card reader, as a result of which no force can be exerted.

Figure 17:
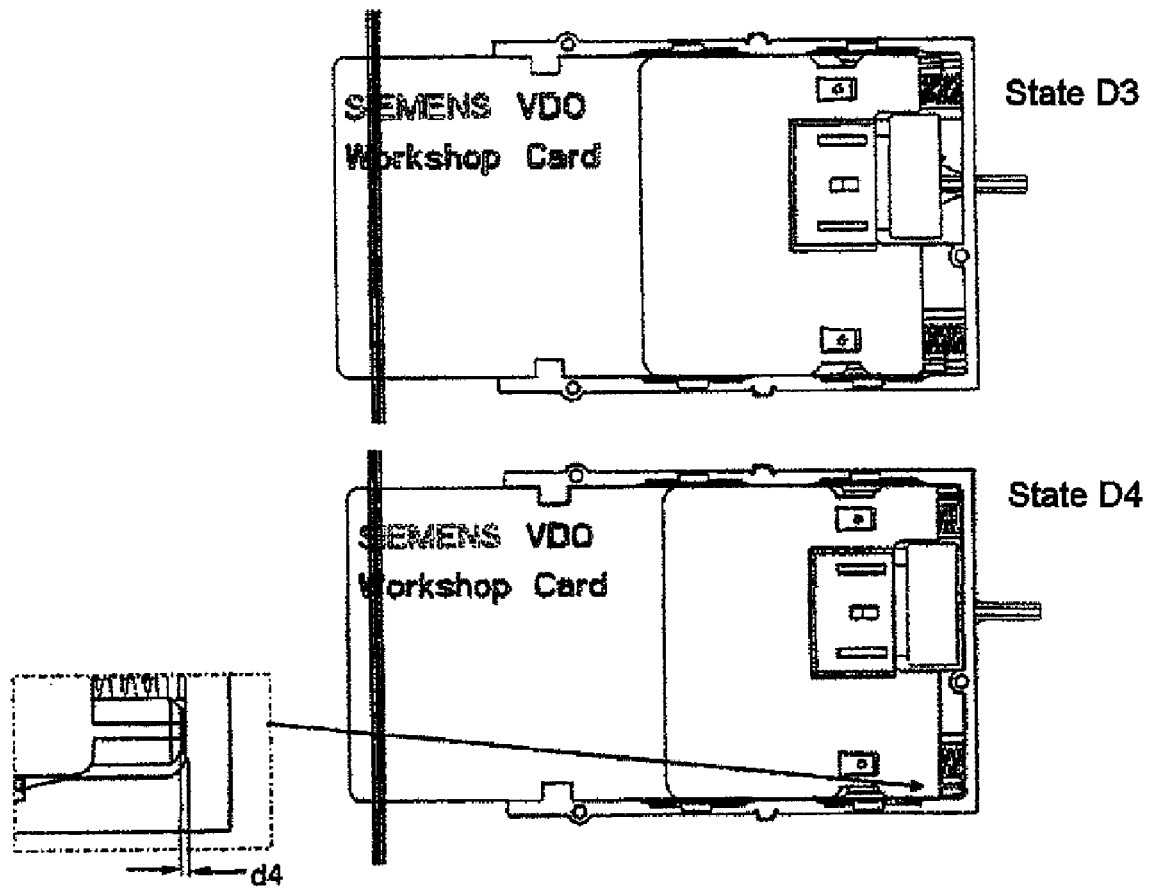
FIG. 17 is a state D3 and a state D4 during removal of the card in one embodiment of the invention.

For this reason, in order to remove the card, it is necessary to first of all push the card against the opening area mentioned above until it is not possible to push it any further. The card has now reached the position D4 illustrated in FIG. 17, and the distance between that end of the large sliding plate part 106 which is remote from the opening area and that end of the base plate 101 which is remote from the opening area is d4. The sliding part 102 is located at the position 7 of the surface D. Because the large and small sliding plate parts 104, 106 as well as the card can now not be moved any further forward, the operator loosens his grip, because the card cannot be pushed any further forward. The card and the sliding plate part are sprung out by the two springs 107, and the state D0a is reached again.

Figure 18:
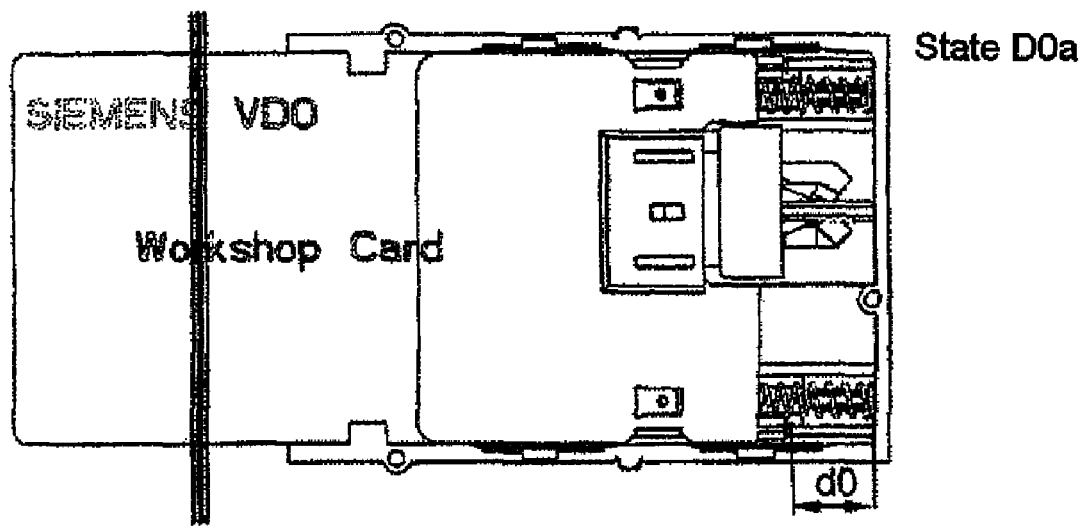
FIG. 18 is a state D0a during removal of a card in one embodiment of the invention.

As shown in FIG. 18, after reaching the state D0a, because of the large card area projecting out of the card reader, the operator can easily grip a large area of the card and can remove it from the card reader. For this reason, the card can now easily be removed. Furthermore, a guard, as illustrated in FIGS. 13 to 18, can be provided together with the card reader according to the present application, restricting the movement of the card in the direction Z, and ensuring insertion of the card without any problems.

It is evident that, after the use of the card reader according to the present application, the card is clamped firmly and can also be removed again easily.

A detailed explanation of the present application has been provided above based on an example of a card reader for motor vehicles. However, technical specialists in the relevant field will see that the present application is in now way restricted to use in motor vehicles, but it can also be used in aircraft, water craft and other vehicles which require a card reader.

The above explanatory notes relate only to preferred practical exemplary embodiments of the present application, without representing any restriction to the use of the present application. All modifications, identical substitutions, improvements etc. within the scope of the idea and the principle of the present application all fall within the scope of protection of the present application.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A card reader for a vehicle configured to read a card, comprising a base plate comprising:
   a curved-in groove;
   an opening area located at one end of the curved-in groove as an insertion opening for the card; and
   an annular groove arranged on a base area of the curved-in groove;
   a sliding plate part arranged above the curved-in groove in the base plate,
   a side of the sliding plate part that points toward the curved-in groove in the base plate is at a distance from the base area of the curved-in groove in the base plate that is at least a thickness of the card;
   a curved-out structure arranged on the side of the sliding plate part that points toward the curved-in groove in the base plate configured to make contact with the card the sliding plate part and drive the sliding plate part such that the sliding plate part slides in a direction vertically with respect to the opening area and facing away from the opening area;

a sliding part arranged on that side of the sliding plate part that points toward the curved-in groove in the base plate, wherein the sliding part is configured to slide in a direction parallel to the opening area is guided through the annular groove, and whereby a position of the sliding plate part is restricted; and a spring element, the base plate, and the sliding plate configured to make contact with one another, wherein vertically directed force is applied to the sliding plate part, with respect to the opening area and toward the opening area.

2. The card reader for a vehicle as claimed in claim 1, wherein the sliding plate part comprises:

a large sliding plate part and a small sliding plate part;

a sliding groove is arranged on a side of the large sliding plate part that points toward the curved-in groove in the base plate, which sliding groove runs vertically with respect to the opening area;

the small sliding plate part comprises an outward bulge on a side facing away from the curved-in groove in the base plate, wherein the outward bulge is inserted into the sliding groove;

a sliding groove is arranged on a side of the small sliding plate part that points toward the curved-in groove in the base plate, the sliding groove runs parallel to the opening area;

wherein one end of the sliding part is arranged in the sliding groove, which runs parallel to the opening area.

3. The card reader for the vehicle as claimed in claim 2, wherein an opening is arranged on each of the two sides of the sliding plate part which each run vertically with respect to the opening area; the curved-out structure is inserted into the openings, and abuts against a clamp, from a side of the large sliding plate part that faces away from the curved-in groove in the base plate, the clamp located away from that side of the large sliding plate part that points toward the curved-in groove in the base plate.

4. The card reader for the vehicle as claimed in claim 1, wherein the spring part is one of a spring and a spring plate.

5. The card reader for the vehicle as claimed in claim 1, wherein the annular groove has a contact switch arranged on its part remote from the opening area, the contact switch configured to contact the sliding part to confirm a correct insertion of the card.

6. The card reader for the vehicle as claimed in claim 5, wherein a circle center point of the curved part of the annular groove located remotely from the opening area is located outside the annular groove, wherein the contact switch is arranged at an upper end of the relevant curved part of the annular groove.

7. The card reader for the vehicle as claimed in claim 5, wherein the annular groove is configured for opposing-direction position restriction, wherein the relevant design for opposing-direction position restriction has a plurality of inclined surfaces, each having a vertical surface.

8. The card reader for the vehicles as claimed in claim 7, wherein the direction of all of the plural vertical surfaces, relative to the inclined surfaces, are arranged in a standard form in a clockwise sense or in a counterclockwise sense.

9. The card reader for the vehicle as claimed in claim 7, wherein a total number of inclined surfaces that each have a vertical surface is 4,2 of which are located on one side of the contact switch, while the other 2 are located on the other side of the contact switch.

10. The card reader for vehicles as claimed in claim 1, wherein the vehicle is one of a motor vehicle, an aircraft, and a watercraft.

* * * * *